United States Patent [19]

Song et al.

[11] Patent Number: 5,623,094
[45] Date of Patent: Apr. 22, 1997

[54] SLED TESTING SYSTEM

[75] Inventors: Seung-Jae Song, Okemos, Mich.; Patrick M. Miller, Alden, N.Y.

[73] Assignee: MGA Research Corporation, Akron, N.Y.

[21] Appl. No.: 586,145

[22] Filed: Jan. 17, 1996

[51] Int. Cl.⁶ .................................................. G01M 7/00
[52] U.S. Cl. ...................... 73/12.07; 73/12.04; 73/866.5
[58] Field of Search ............................ 73/12.04, 12.07, 73/865.3, 866.4

[56] References Cited

U.S. PATENT DOCUMENTS

| | | |
|---|---|---|
| 2,810,288 | 10/1957 | Herron et al. .................. 73/12.07 |
| 3,001,393 | 9/1961 | Greayer . |
| 3,113,452 | 12/1963 | Dean et al. . |
| 3,430,481 | 3/1969 | Shinbaum et al. . |
| 3,435,667 | 4/1969 | Browning et al. . |
| 3,757,562 | 9/1973 | Goldberg et al. . |
| 3,939,691 | 2/1976 | Stanev et al. . |
| 4,545,236 | 10/1985 | Turczyn ......................... 73/12.04 |
| 5,483,845 | 1/1996 | Stein et al. ..................... 73/865.3 |

Primary Examiner—Richard Chilcot
Assistant Examiner—Ronald Biegel
Attorney, Agent, or Firm—Brooks & Kushman P.C.

[57] ABSTRACT

A sled testing system comprising a first carriage and a second carriage, the first carriage and second carriage being movably mounted together, and an acceleration absorption assembly located relative to the first carriage and the second carriage such that when the second carriage is accelerated at a second carriage rate, the first carriage will be accelerated at a first carriage rate.

29 Claims, 8 Drawing Sheets

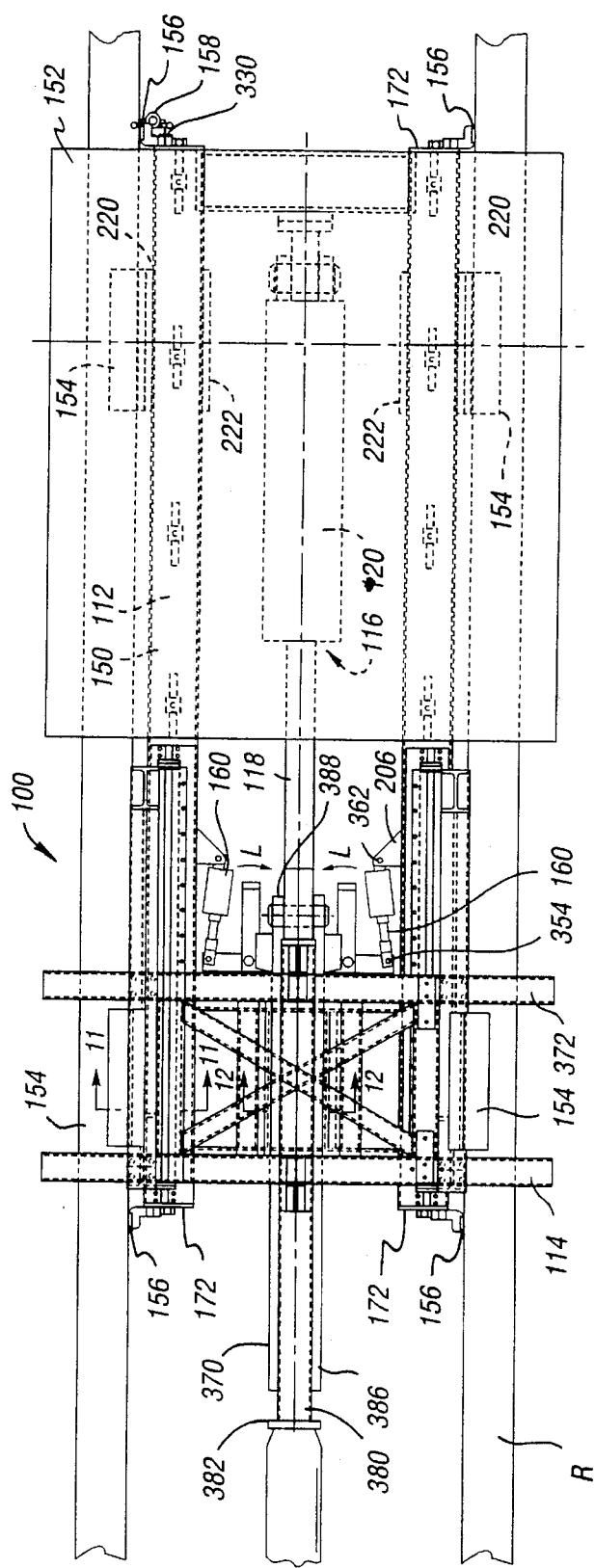
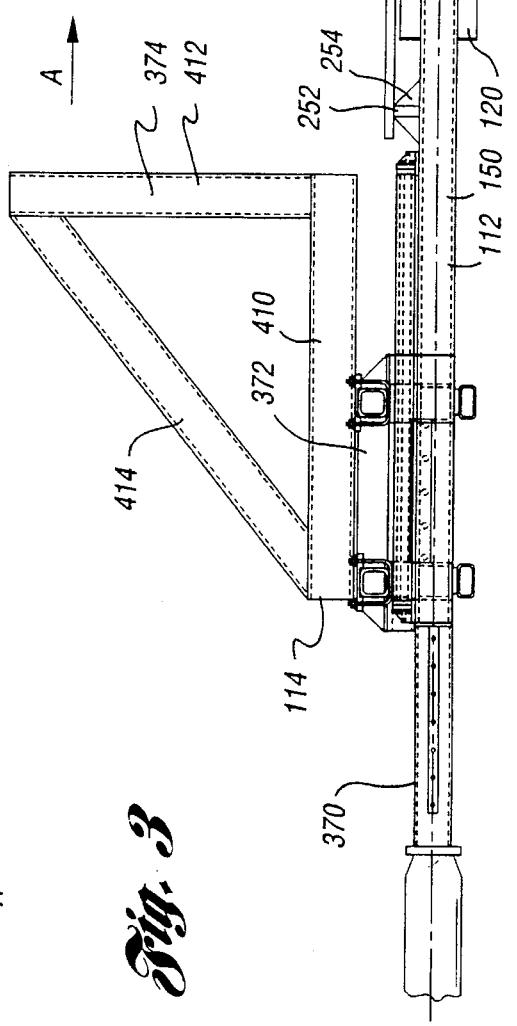
Fig. 2
Fig. 3

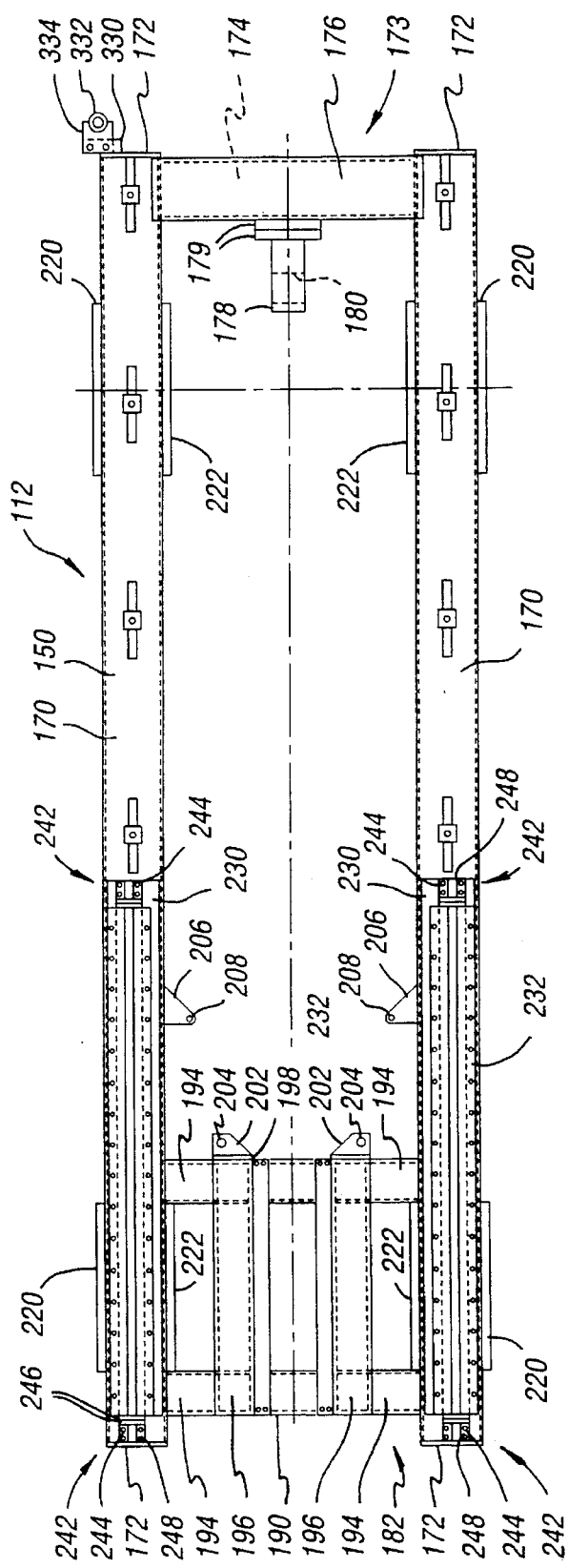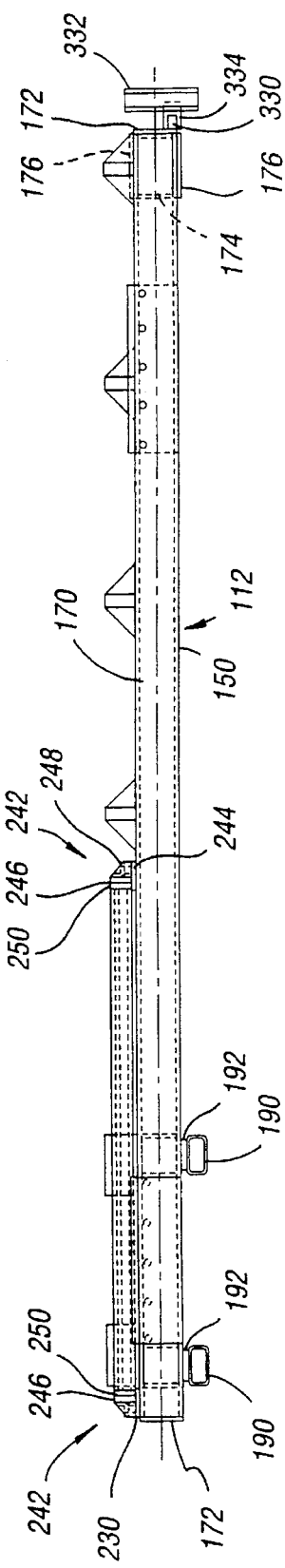

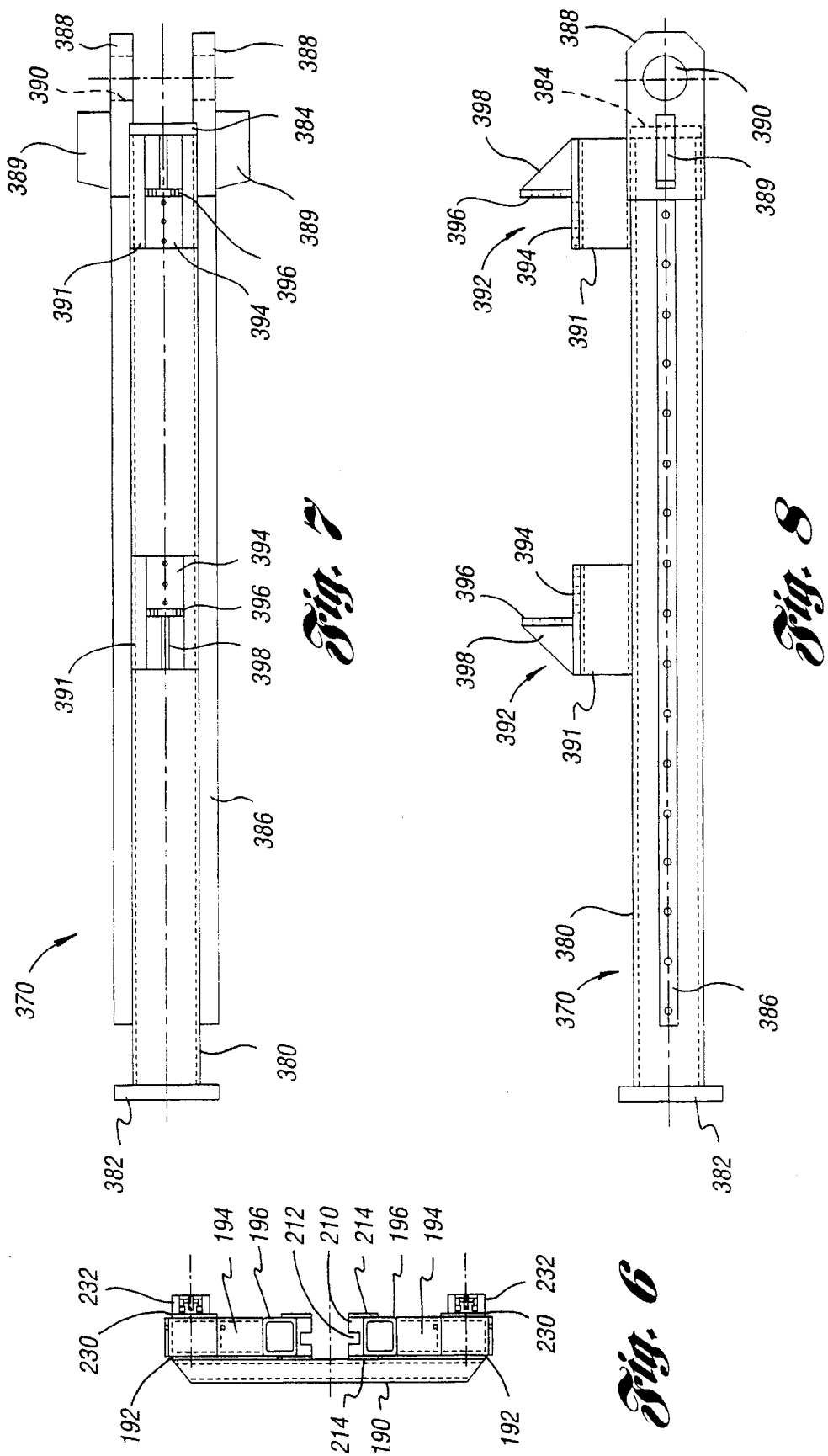

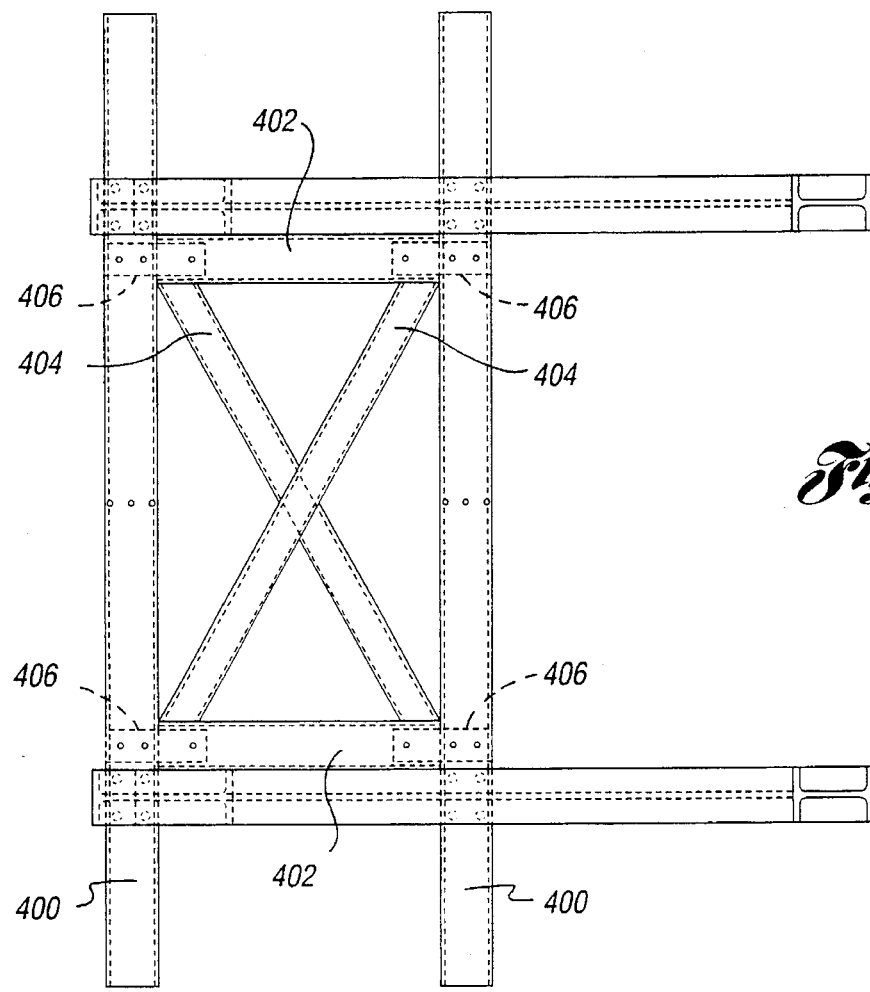
Fig. 9
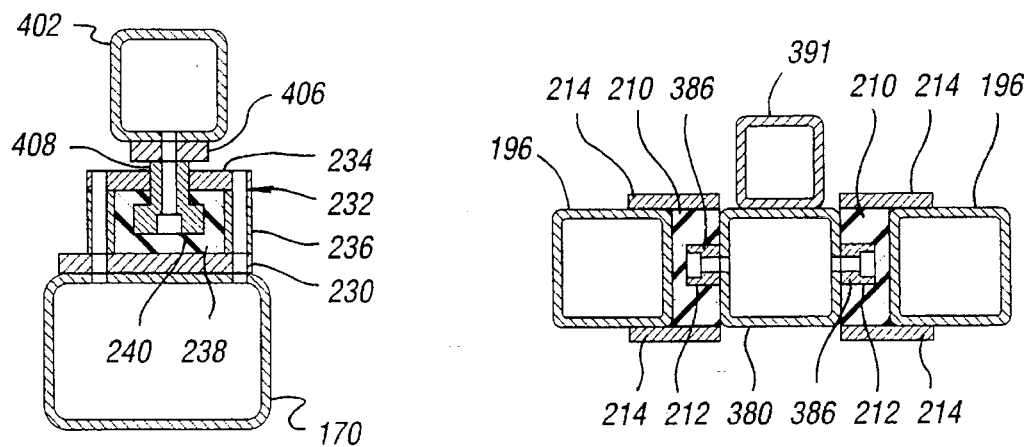
Fig. 11
Fig. 12

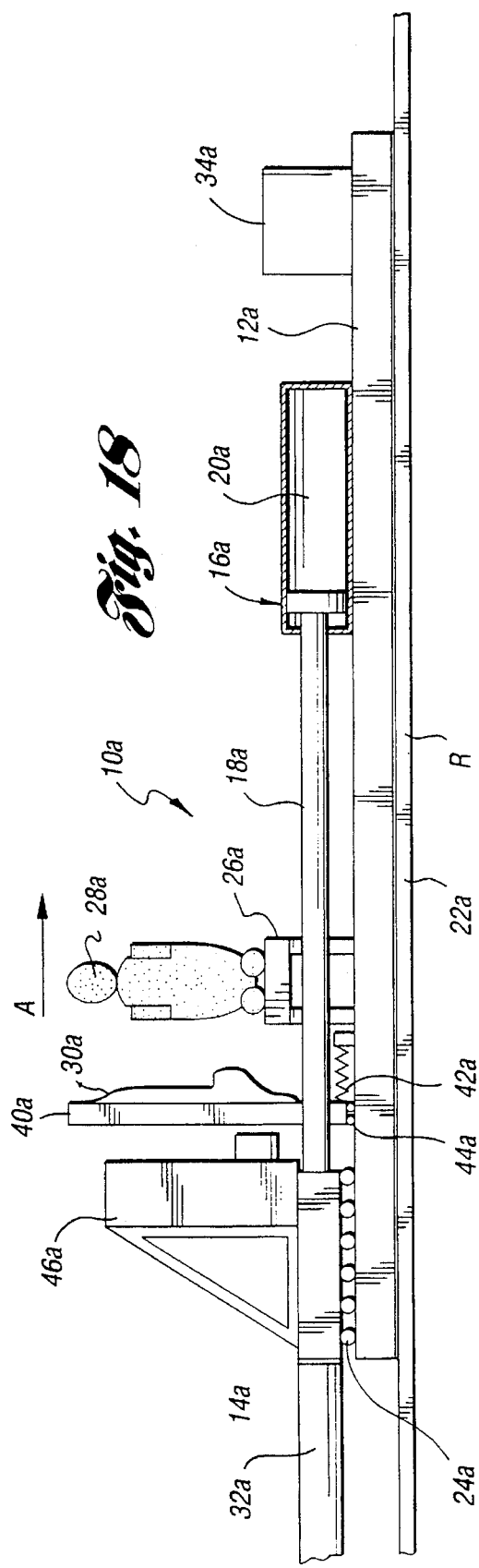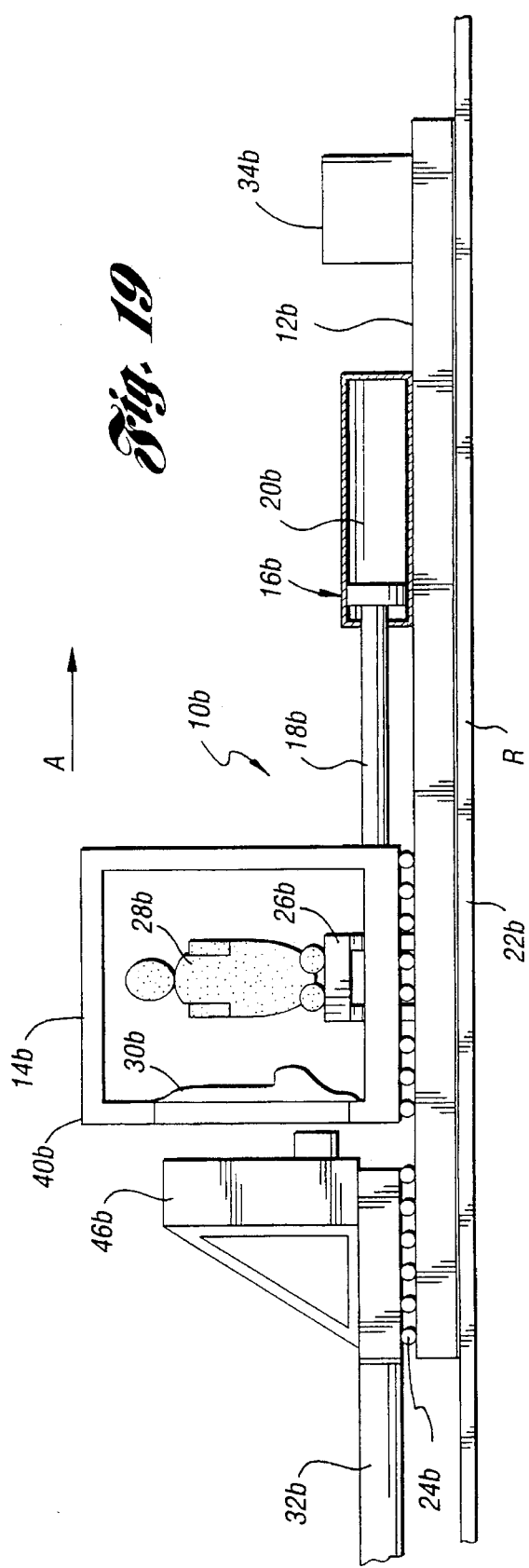

SLED TESTING SYSTEM

TECHNICAL FIELD

This invention relates to a sled testing system for vehicular crash testing.

BACKGROUND ART

Vehicular crash testing is sometimes done by crashing vehicles into a barrier. Dummies are often placed within the interior of such vehicles in order to test safety equipment and determine the effect of such crashes on the occupants of a vehicle. The result of such crash testing is that the vehicles themselves are damaged.

As an alternative to testing vehicles by crashing them into barriers, sled testing systems are alternatively used where a portion of the vehicle, such as the interior or an interior component, may be subjected to accelerative forces similar to those which would be experienced during a crash. Like full vehicle testing, dummies may be placed within the interior or interior components of the vehicle being tested in order to test safety equipment, such as passenger restraints or cushioning, and determine the effect of a crash on the occupants.

Typically, the portion of the vehicle being tested, such as the interior, is mounted on a sled carriage which in turn is slidably mounted onto rails. A pneumatically or hydraulically driven piston is typically employed to drive the sled carriage in an accelerative manner such that the vehicle interior or other vehicle portion is accelerated at a rate similar to that experienced during a collision. The pneumatically or hydraulic driven piston, or driver member, typically includes a mechanism in order to control the acceleration of the sled carriage at various points along its path of travel. For example, in the case of a pneumatically driven system, a metering pin is often connected to one end of the pneumatically driven piston which in turn is slidably housed within a pneumatic tube. The metering pin is located between a load or high pressure chamber and a set or low pressure chamber within the pneumatic tube in order to control and regulate the acceleration. Such mechanisms for controlling acceleration rates, such as metering pins, and the overall driving mechanisms, such as pneumatic tube assemblies, are well known in the art and will not be discussed in further detail.

A problem with such typical sled testing systems is that the entire vehicle portion being tested is accelerated at the same rate. In actual collisions, the exterior portion of the vehicle being impacted is accelerated at one rate and is deformed so as to absorb some of the impact before that impact force is transmitted to accelerate other portions of the vehicle. In other words, different portions of the vehicle are accelerated at different rates.

In a more specific example, if a vehicle is impacted from the side, the door panel or panels of the vehicle being impacted will accelerate at one rate while absorbing some of the impact force in the form of door panel deformation. Because the door panel or panels will deform inwardly to some extent before the impact is transmitted to the remainder of the vehicle, the remainder of the vehicle will be accelerated at a different rate than the door panels. Accordingly, a typical sled testing system will not provide an accurate representation of the manner in which exterior body panels, such as door panels, will effect occupants of the vehicle interior or interior components being tested.

In an effort to more accurately simulate collisions, such as side collisions, sled testing systems have been employed in which a vehicle interior portion and an exterior panel, such as a side door panel, are mounted relative to one another onto one vehicle sled carriage so as to simulate their relative positions when assembled as components of a vehicle. A second impacter sled carriage is then driven into the side panel of the vehicle being tested such that the side panel being impacted is accelerated at one rate and is deformed so as to absorb some of the impact before that impact force is transmitted to accelerate the vehicle sled carriage and, accordingly, the vehicle interior portion.

While such sled testing systems using two movable carriages movably mounted upon the same platform have been used, an alternative system has been employed in the past where the vehicle carriage carrying a vehicle interior portion and an exterior panel is movably mounted on the impacter carriage which has an impacter structure. When the impacter carriage is forcibly accelerated, the impacter carriage will be acceleratingly moved relative to the vehicle carriage such that the exterior panel, such as a door panel, will be impacted by the impacter structure of the impacter carriage. The exterior panel will then deform so as to absorb some of the impact before the impact force is transmitted to accelerate the vehicle carriage and, accordingly, the vehicle interior portion.

However, there is a problem with both variations of the last system described. Because the acceleration of the vehicle carriage will be dependent upon the impact with, and absorption of the impact by, the exterior panel mounted on the vehicle carriage, the vehicle carriage acceleration cannot be controlled accurately and tests performed with such systems cannot be accurately controlled or repeated.

SUMMARY OF THE INVENTION

An object of the present invention is to provide an improved sled testing system which allows different parts of a sled testing system to be accelerated at different rates relative to each other.

In carrying out the above object, and other objects and features of the present invention, an improved sled testing system is provided. The improved sled testing system of this invention comprises a first carriage and a second carriage, the first carriage and second carriage being movably mounted together. An acceleration absorption assembly is located relative to the first carriage and second carriage such that when the second carriage is accelerated at a second carriage rate, the first carriage will be accelerated at a first carriage rate. In a more specific embodiment, the first carriage may be a movable main carriage and the sled testing system may include rails upon which the movable main sled carriage is movably mounted.

The improved system of this invention provides a number of advantages, one being that the relative accelerations of the first carriage and second carriage may be controlled to some extent.

In an alternative embodiment, a tertiary carriage is mounted to the main sled carriage such that when the second carriage is accelerated at a second carriage rate to impact the tertiary carriage, the tertiary carriage will be accelerated at a tertiary carriage rate and the main sled carriage will be accelerated at a main sled carriage rate. The tertiary carriage may be movably mounted to the main sled carriage and may further include a shock absorption assembly connected between the tertiary carriage and the main sled carriage.

One advantage of this embodiment is that while utilizing an actual impact, it allows the accelerations of the various moving components of the system to be controlled.

In another alternative embodiment offering the same advantage, the sled testing system may include an impacter carriage movably mounted to the main sled carriage such that when the impacter carriage is accelerated to impact and accelerate the second carriage at a second carriage rate, the main sled carriage will be accelerated at a main sled carriage rate.

Like the last alternative, one advantage of this alternative is that while utilizing an actual impact, the relative accelerations of the main sled carriage and the second carriage can be controlled.

In each of these embodiments, the acceleration absorption assembly may include a backing cylinder from which extends an absorption piston, one of the backing cylinder and absorption piston being mounted to the first carriage and the other one of the backing cylinder and absorption piston being mounted to the second carriage.

In each of these embodiments, the second carriage may be movably mounted to the first carriage by slidably engaging the first carriage.

In each of these embodiments, the sled testing system may further include rails upon which the movable main sled carriage is slidably mounted. Furthermore, the main sled carriage may include a slide and brake assembly which slidably engages the rails and which may be activated so as to brake the main sled carriage after it is accelerated at the main sled carriage rate.

In each of these embodiments, the main sled carriage may include a recoil lever assembly which may engage the second carriage after the second carriage has been accelerated at the second carriage rate in the event the secondary carriage recoils relative to the main carriage.

Furthermore, in each of these embodiments, the carriage being initially accelerated may be accelerated by a driving member, such as a pneumatically driven piston.

Further objects and advantages of this invention will be apparent from the following description, reference being had to the accompanying drawings wherein the preferred embodiments of the present invention are clearly shown.

BRIEF DESCRIPTION OF THE DRAWINGS

While various embodiments of the invention are illustrated, the particular embodiment shown should not be construed to limit the claims. It is anticipated that various changes and modifications may be made without departing from the scope of this invention.

FIG. 2 is a plan view showing one embodiment of the sled testing system of this invention;

FIG. 3 is a side view of a sled testing system shown in FIG. 2;

FIG. 4 is a plan view of the main sled carriage used in the embodiment shown in FIGS. 2 and 3;

FIG. 5 is a side view of the main sled carriage shown in FIG. 4;

FIG. 6 is an end view of the main sled carriage shown in FIG. 4;

FIG. 7 shows a plan view of the sled column assembly used in the embodiment shown in FIGS. 2 and 3;

FIG. 8 is a side view of the sled column assembly shown in FIG. 7;

FIG. 9 is a plan view of the slide frame assembly together with the fixture assembly used in the embodiment shown in FIGS. 2 and 3;

FIG. 11 is a section taken along line 11—11 of FIG. 2;

FIG. 12 is a section taken along line 12—12 of FIG. 2;

FIG. 18 is a schematic showing an alternative embodiment of the sled testing system of this invention; and FIG. 19 is a schematic showing another alternative embodiment of the sled testing system of this invention.

BEST MODE FOR CARRYING OUT THE INVENTION

Figure 1:
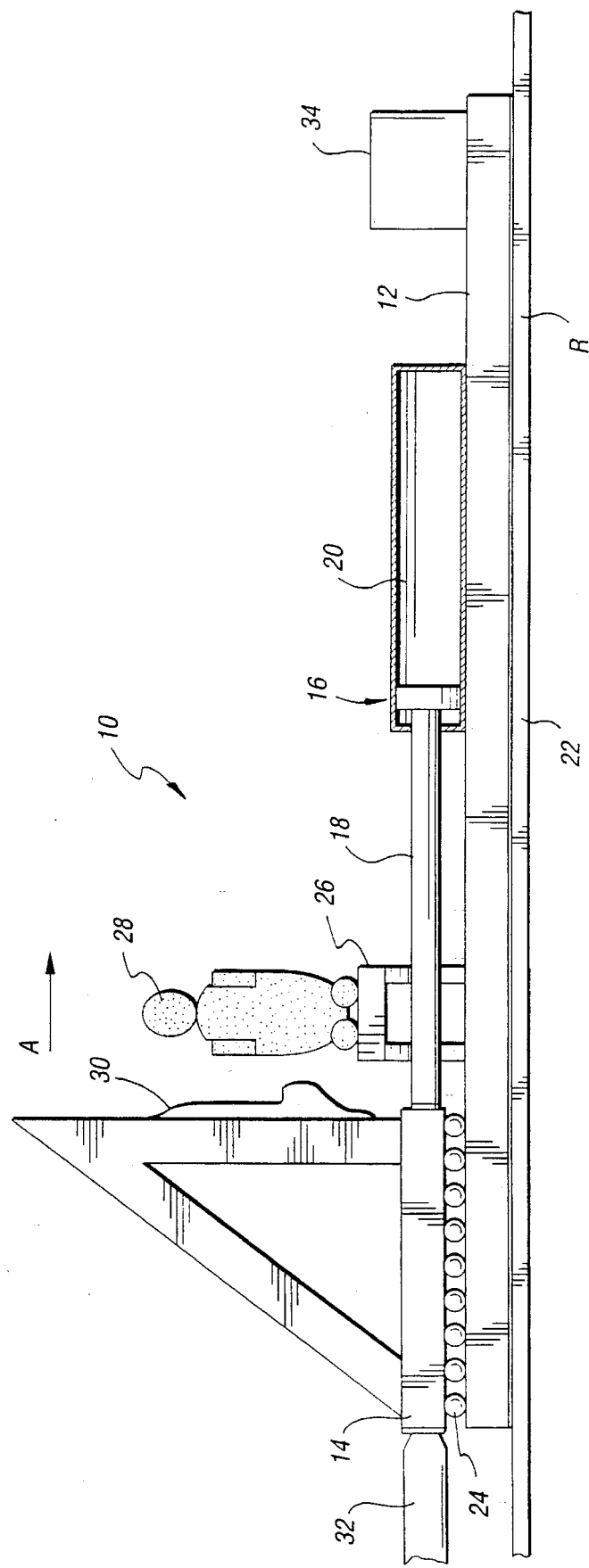
FIG. 1 is a schematic showing one embodiment of the sled testing system of this invention.

A schematic of one embodiment of a sled testing system 10 of the invention is shown in FIG. 1. The sled testing system includes a first carriage which in this embodiment is a main sled carriage 12, a second carriage which in this embodiment is a secondary carriage 14, and an acceleration absorption assembly 16 having an absorption piston 18 and a backing cylinder 20.

In the embodiment shown, the main sled carriage 12 is movably mounted on a carriage platform 22. In the schematic embodiment shown, the carriage platform 22 constitutes rails "R" along which the main sled carriage 12 may slide. The secondary carriage 14 is movably mounted on the main sled carriage 12. While rollers 24 are shown in the FIG. 1 schematic, any type of arrangement may be used which allows the secondary carriage 14 to move relatively to the main carriage 12, such as a second sliding rail type assembly.

The backing cylinder 20 is fixed to the main sled carriage 12 and has the absorption piston 18 extending from the backing cylinder 20. The absorption piston 18 is in contact with the secondary carriage 14 such that if the secondary carriage is moved in the direction marked "A", the absorption piston 18 will be driven into the backing cylinder 20 which is of a pneumatic, hydraulic or other design so as to absorb some portion of the accelerative forces such that the main sled carriage 12 will be accelerated in the direction "A" at a different rate from that of the secondary carriage 14.

Some portion of a vehicle desired to be tested, such as an interior 26, may be mounted onto the main sled carriage 12. Additionally, one or more dummies 28 may be situated in or on the interior 26 so as to test the effect of simulated crash acceleration on vehicle occupants and any protection offered to such occupants by any safety components such as side door air bags, door padding, or any other devices intended to provide protection to vehicle occupants during side or other type collisions.

Any other portion of the vehicle, such as any exterior body portion, like a door 30, may be mounted on the secondary carriage 14 in a physical relationship with the interior 26 and dummy 28 so as to simulate the relative positions and movements during a crash.

In operation, the secondary carriage 14 carrying the door 30 is acceleratingly driven by a driving member 32, such as a conventional hydraulically driven piston. In such a manner, the door 30 or other vehicle portion may be accelerated at one rate. The absorption piston 18 is likewise driven in the direction "A", into the backing cylinder 20, by the secondary carriage 14. The backing cylinder 20 will absorb some of the accelerative forces such that the main sled carriage 12, together with the interior 26 and dummy 28, will be accelerated at a different desired rate. Data collection apparatus or instrumentation 34 may be mounted onto or operably coupled to the main sled carriage 12 and be connected to the various components being tested in order to record information. For example, transducers may be mounted on the secondary carriage 14, the door 30 or other vehicle portion, and dummies 28, in order to measure responses to the simulated collision with such response data being transferred to and collected by the data collection apparatus or instrumentation 34. Such data collection apparatus or instrumentation, or other test data collectors and analyzers, are well known in the art and will not be discussed in greater detail here.

In an actual collision, the portion of the vehicle being impacted, such as any exterior body portion like a door 30, will deform inwardly to some extent. Accordingly, and in order to simulate an actual crash more effectively, the door 30 or any other portion of the vehicle mounted to the secondary carriage 14, may be pre-crushed so as to more closely simulate the actual intrusion of that body portion, such as a door 30, into the interior area of the vehicle being tested.

FIGS. 2–17 show a more detailed representation of a sled testing system 100 designed to operate similar to the embodiment shown in FIG. 1. Unless noted, all components of this system may be made from any suitable grade of steel. As can be seen in FIGS. 2 and 3, the sled testing system 100 of this embodiment includes a main sled carriage 112, a secondary carriage 114 and an acceleration absorption assembly 116 having an absorption piston 118 and a backing cylinder 120.

As shown in FIGS. 2–5, the main sled carriage 112 has a main frame 150, a fixture plate 152, slide-and-brake assemblies 154, alignment guide assemblies 156, a return assembly 158, and recoil lever assemblies 160.

As shown in FIGS. 4–5, the main frame 150 is constructed from main frame tubes 170 having end caps 172. Interconnecting the main frame tubes 170 near the rear end 173 of the main frame 150 is a connecting rear tube 174 which is reinforced by an overlying and underlying gusset plates 176 which overlap top and bottom surface portions of the main frame tubes 170, respectively. A backing cylinder mount 178 having reinforcing plates 179 is mounted to the connecting rear tube 174, and in the embodiment shown, has a backing cylinder mount bore 180. All of these members may be connected together by welding or in any other suitable manner.

As shown in FIGS. 4–6, the main frame tubes 170 are connected together at the front end 182 of the main frame 150 via front brace tubes 190 which, as shown in FIGS. 5–6, are connected to the underside of the main frame tubes 170 with a brace spacer plate 192 therebetween. Guide tube stabilizers 194 are connected to the inside surfaces of the main frame tubes 170 so as to be on top of the brace spacer plates 192. Sled column guide tubes 196 are then connected between the guide tube stabilizers 194 as shown in FIGS. 4 and 6. All of these members may be connected together by welding or in any other suitable manner.

Guide tube rear caps 198 are connected to the rear portion of the sled column guide tubes 196 such as by welding or any other suitable manner. As shown in FIG. 4, recoil rachet lever mount plates 202 having rachet lever mount bores 204 are connected to the guide tube rear caps 198 such as by welding or any other suitable connection. Similarly, recoil cylinder mounting plates 206 having recoil cylinder mounting bores 208 are connected by welding or any other similar means to the inside surface of the main frame tubes 170, as shown in FIGS. 2 and 4.

As shown in FIGS. 6 and 12, guide bearings 210 having guide bearing channels 212 are mounted onto the side of each sled column guide tube 196 via guide support plates 214 to which the guide bearing 210 may be mounted via bolts or screws or any other suitable connectors. While the guide bearing 210 may be made of any suitable material, a plastic composite such as Ultra High Molecular Weight Polyethylene (UHMW) has been found to be suitable. Such UHMW is available through McMaster-Carr Supply Company, P.O. Box 440, New Brunswick, N.J. 08903-0440, or any other suitable industrial plastic supply business.

As shown in FIGS. 2 and 4, brake mounting plates 220 and brake backing plates 222 are likewise connected by welding or any other suitable manner to the inside and outside side surfaces of the main frame tubes 170, respectively.

As best seen in FIGS. 4, 5, 6 and 11, a slider base plate 230 and L-shaped slider bearing clamps 232 having horizontal plate portions 234 and vertical plate portions 236 are connected, such as by bolting through the vertical plate portions 236, to the upper surface of the main frame tubes 170 so as to enclose a slider bearing 238 having a slider bearing channel 240. The horizontal plate portions 234 and the vertical plate portions 236 of the L-shaped slider bearing clamps 232 may be connected together by welding or any other suitable manner. While not shown, the slider base plate 230 and L-shaped slider bearing clamps 232 could be milled out of one solid block of suitable material, such as steel. As shown in FIGS. 4 and 5, the slider bearing 238 is enclosed at each end of the slider bearing clamp 232 by slider stop assemblies 242 comprising horizontal stop plates 244 which may be bolted or otherwise connected to the slider base plate 230 and the main frame tube 170, vertical stop plates 246 and stop gusset plates 248, which may be welded together or connected in any other suitable manner. A bumper 250, which may be made from cast polyurethane is fastened to the inside surface of the vertical stop plates 246 by the use of suitable adhesives and mechanical fasteners. Suitable cast polyurethane material is available from McMaster-Carr Supply Company, or any other suitable industrial plastic supply business.

As best shown in FIG. 3, the fixture plate 152 may be mounted, by bolting or any other suitable method, atop fixture plate support posts 252 which may be welded or otherwise suitably connected to the main frame tubes 170 and reinforced by fixture plate support gussets 254.

Figure 13:
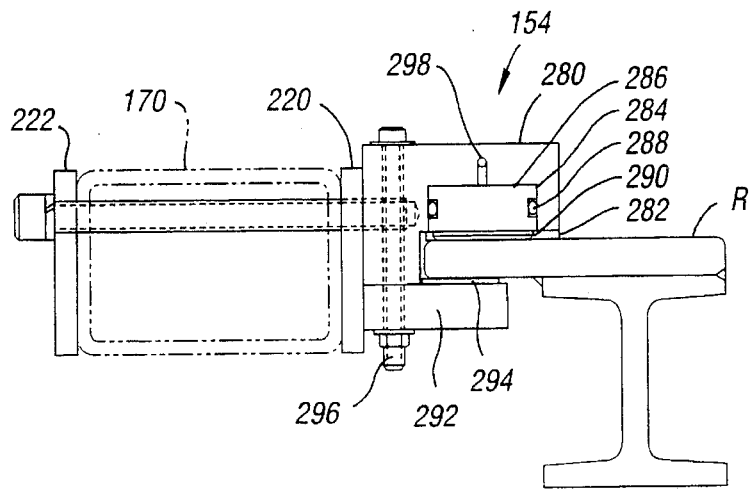
FIG. 13 is a detail section of the slide and brake assembly used in the embodiment shown in FIGS. 2 and 3.
Figure 14:
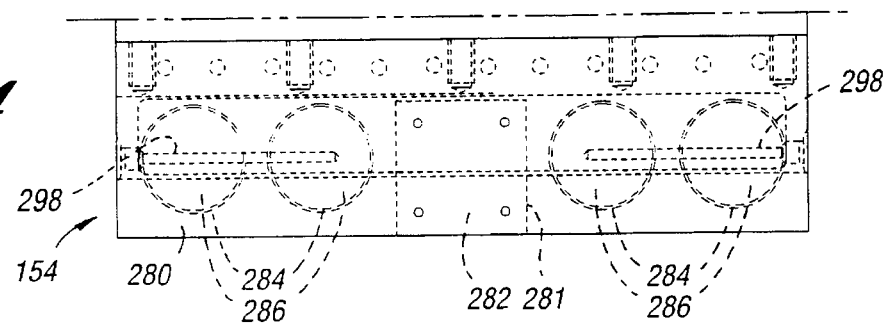
FIG. 14 is a plan view of the slide and brake assembly shown in FIG. 13.

As shown in FIG. 13, the slide and brake assemblies 154 may be connected to the brake mounting plates 220 by bolting through the brake mounting plates 220, the main frame tubes 170, and the brake backing plates 222, or in any other suitable manner. As shown in FIGS. 13 and 14, the slide and brake assembly 154 includes an upper block 280 having a pocket 281 in which a UHMW pad 282 is connected in any suitable manner, such as by the use of suitable adhesives and mechanical fasteners, such as countersunk screws, such that the UHMW pad 282 will slidingly engage a rail "R" on which the main sled carriage 112 will move upon. As shown in FIGS. 3 and 13, the rail "R" may comprise a horizontal plate "HP" welded or bolted to an I-beam "IB." Such rails are well known in the art and will not be discussed in greater detail here.

The upper block 280 also defines piston bores 284 in which pistons 286 and piston rings 288 are operatingly housed. As shown in FIG. 13, a brake pad 290 comprising any suitable brake pad material such as non-asbestos clutch facing sheet material is mounted in a pocket on the bottom surface of the piston 286 by way of any suitable adhesive or mechanical fastener. Such non-asbestos clutch facing sheet material may be obtained through McMaster-Carr Supply Company, or any other suitable industrial supply company. The slide and brake assembly 154 also includes a lower block 292 having a lower brake pad 294 which, similar to the piston brake pad 290, may be made of any suitable brake material such as non-asbestos clutch facing sheet material. The upper block 280 and lower block 282 may be connected in any suitable manner such as by a connector bolt and nut assembly 296 as shown.

The upper block 280 also defines conduits 298 through which air or hydraulic fluid may be fed to the upper surface of the piston bores 284. In operation, when it is desired to slow down or stop the main carriage 112, air or hydraulic fluid, which may be liquid or gaseous in form, is supplied to the conduits 298 via hydraulic lines (not shown) which in turn may be connected to a suitable pressurized gas tank (not shown) which may be connected to the main frame 150 of the main sled carriage 112. A tripping mechanism (not shown) may also be employed and connected to the main frame 150 of the sled carriage 112 so as to engage a trip arm (not shown) on the rail "R" so as to release pressurized gas from the gas cylinder (not shown) through the hydraulic lines (not shown) and into the conduits 298. The pistons 296 are then forced downward by the hydraulic fluid such that the rail "R" is clamped between the piston brake pad 290 and the lower brake pad 294 thereby slowing or stopping the main carriage 112 as desired. Such slide and brake assemblies 154, including the components not shown, such as the hydraulic lines, the pressurized gas cylinder, the tripping mechanism, and the trip arm, are well known in the art and well not be described in further detail here.

Figure 15:
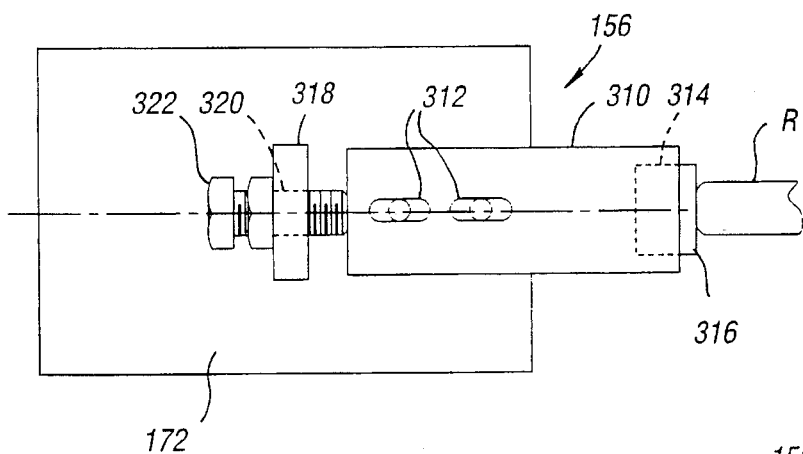
FIG. 15 is a side view of the alignment guide assembly used in the embodiment shown in FIGS. 2 and 3.
Figure 16:
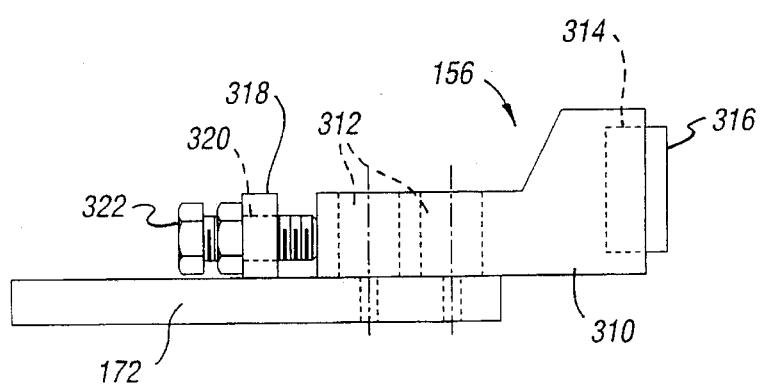
FIG. 16 is a plan view of the alignment guide assembly shown in FIG. 15.

As shown in FIGS. 2, 15 and 16, alignment guide assemblies 156 are connected to the end caps 172 of the main frame tubes 170 such as by bolting or by using any other suitable mechanical fastener. As shown in FIGS. 14 and 15, the alignment guide assembly comprises a guide block 310 having slotted bores 312 and a bearing block recess 314 housing a bearing block 316. The bearing block 316 may be mounted within the bearing block recess 314 via any suitable adhesives and mechanical fasteners, such as bolts, and may be made from any suitable material. A plastic composite such as UHMW has been found to be suitable. The guide block 310 may be bolted to the end caps 172 of the main frame tubes 170 such that it is adjustable laterally along the slotted bores 312. Thus, the guide block 310 may be adjusted from time to time as the bearing block insert 314 wears down such that the bearing block insert may bear upon the side of the rails "R" of the sled testing system 100 so as to prevent unnecessary lateral movement of the main sled carriage 112 during operation.

Additional lateral support to the guide block 310 is provided via a tap plate 318 having a tapped bore 320 which threadingly engages a bolt and nut assembly 322 which, as shown in FIGS. 15 and 16, may be adjusted so as to provide lateral support to guide block 310 when it is readjusted to account for bearing block insert 314 wear. Such alignment guide assemblies are known in the art and will not be described in further detail here.

As shown in FIGS. 2–5, a return assembly 158 is also connected to one of the front end caps 172. The return assembly 158 comprises a return pin mount plate 330 which is connected to an appropriate end cap 172 by welding or any other suitable connection.

A return pin tube 332 is connected to return pin adjustment plates 334 by welding or in any other suitable connection. In the embodiment shown, and as best shown in FIGS. 3 and 5, the return pin adjustment plate 334 is slotted such that the return pin mount plate 330 may be inserted within the slot before connecting the return pin adjustment plate 334 to the return pin mount plate 330. The return pin adjustment plates 334 may be bolted or otherwise suitably connected to the top and bottom of return pin mount plate 330. If bolted, the holes on either the return pin mount plate 330 or return pin adjustment plate 334, or both, may be slotted so that the assembly is adjustable.

Lastly, the return assembly 158 includes a return plunger 336 having a handle portion 338 and a threaded portion 340 which threadably engages the return pin tube 332 so as to be vertically adjustable. The return assembly 158 is used to move the main sled carriage 112, such as when the main sled carriage 112 needs to be moved back into position after it has been hydraulically accelerated. In order to use the return assembly 158, the return plunger 336 is adjusted vertically via the handle portion 338 such that it will descend into and engage a chain link assembly (not shown) which may be driven to move the main sled carriage 112 back and forth along the rails "R". Such return assemblies are known in the art and will not be discussed further here.

Figure 17:
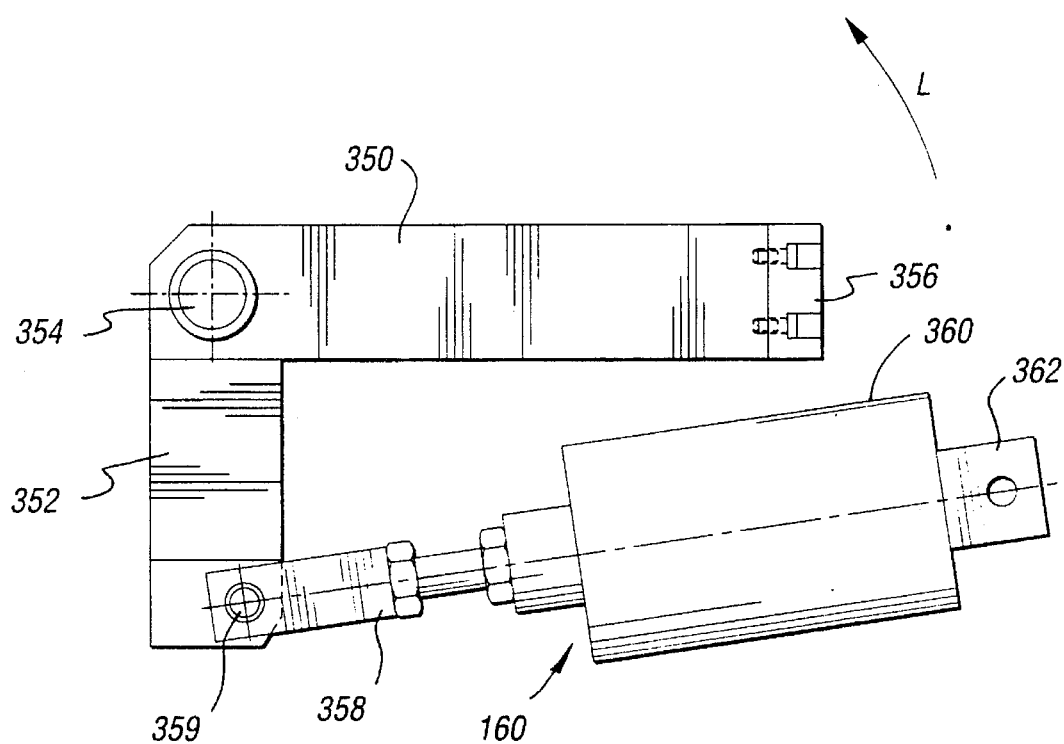
FIG. 17 is a plan view of the recoil lever assembly used in the embodiment shown in FIGS. 2 and 3.

As shown in FIGS. 2 and 17, the recoil lever assembly 160 includes a ratchet bar 350 and a ratchet lever 352 which are pivotally connected to each other and to the ratchet lever mount bore 204 of the recoil ratchet lever mount plate 202 via a main bearing assembly 354, such as a McMaster 6391K283 bronze bearing used in conjunction with a shoulder bolt. The McMaster bronze bearing may be obtained, of course, through the McMaster-Carr Supply Company. Attached to the end of the ratchet bar 350 is a recoil bumper 356 which comprise any suitable material such as urethane. The recoil bumper 356 may be connected to the ratchet bar 350 via any suitable means, such as by recessed screws. As shown in FIG. 17, the end of the ratchet lever 352 opposite the main bearing assembly 354 is connected to a ratchet clevis 358 via any suitable pivotable connection, such as a clevis bearing 359. A McMaster 6391K212 clevis bearing has been found to be suitable.

As shown in FIG. 17, the ratchet clevis 358 is connected in turn to any suitable recoil hydraulic cylinder 360, such as a Bimba air cylinder having part no. 701-DXP. Such a Bimba air cylinder may be obtained through Bimba Manufacturing Company, Monee, Ill. 60449-0068. As shown in FIGS. 2 and 17, the hydraulic cylinder 360 has a cylinder bore 362 which may be used to connect the recoil hydraulic cylinder 360 to the recoil cylinder mounting bore 208 of the recoil cylinder mounting plates 206 via any suitable connection which would allow the parts to rotate relative to each other such as by use of a shoulder screw. The operation of the recoil lever assembly 160 will be explained in further detail when the operation of the sled testing system 100 is explained.

As shown in FIGS. 2 and 3, the secondary carriage 114 includes a sled column assembly 370, a secondary carriage slide frame assembly 372, and an A-frame assembly 374.

As shown in FIGS. 2, 7, 8 and 12, the sled column assembly 370 includes a sled column tube 380 having a column contact plate 382 connected to one end by welding or any other suitable connection. A column end plate 384 having dimensions substantially similar to those of a cross section of the sled column tube 380 may be connected to the other end of the sled column tube 380 by welding or any other suitable connection. Guide rails 386, which may constitute lengths of steel having a rectangular cross-section, are connected through each slide of the column tube 380 by bolting, welding, or any other suitable connection.

Acceleration absorption mount plates 388, such as the cylinder mount plates shown, having mount bores 390 are connected to each side of the sled column tube 380 by welding or any other suitable connection. Recoil ears 389 are connected to the sides of the absorption mount plates 388.

Fixture mount tubes 391 are connected to the top of the sled column tube 380 by welding or any other suitable connection. Mounted on top of the fixture mount tube 391 is a fixture mount assembly 392 comprising a fixture mount base plate 394, fixture mount vertical plate 396, and a fixture mount gusset plate 398. Each of the components making up the fixture mount assembly 392 may be connected together by welding or any other suitable connection.

Figure 10:
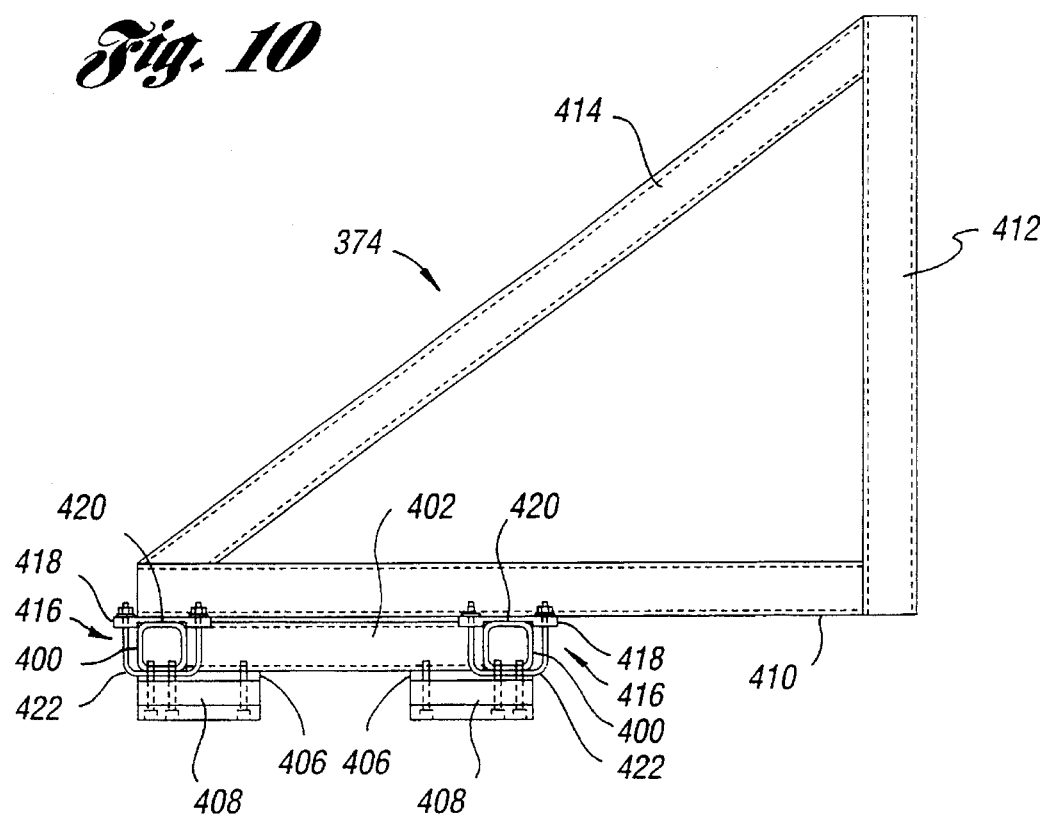
FIG. 10 is a side view of the secondary carriage slide frame assembly together with the fixture assembly used in the embodiment shown in FIGS. 2 and 3.

As shown in FIGS. 9, 10 and 11, the secondary carriage slide frame assembly 372 of the secondary carriage 114 includes main tubes 400 connected together via connecting tubes 402 and reinforced via gusset tubes 404 all of which may be welded together or connected together in any other suitable manner. A tapped plate 406 and a T-shaped slider guide 408 are then connected to the underside of the secondary carriage slide frame assembly 372 as shown in FIGS. 10 and 11, by bolting or any other suitable connection.

As shown in FIGS. 3 and 10, connected to the secondary carriage slide frame assembly 372 is the A-frame fixture assembly 374. In this embodiment, and as shown in FIG. 10, the A-frame fixture assembly comprises a horizontal beam 410, a vertical beam 412, and a gusset beam 414, all of which may be connected together by welding or any other suitable manner. Clamps 416 are connected to the bottom of the horizontal beam 410. The clamps 416 may include a clamp plate 418 having a tube recess 420 and U-bolts 422. The clamp plate 418 may be connected to the bottom of the horizontal beam 410 by welding or in any other suitable manner.

As shown in FIG. 10, the U-bolts 422 are used to clamp the A-frame fixture 374 to the main tubes 400 of the secondary carriage slide frame assembly 372 such that the main tubes 400 reside within the tube recesses 420 of the clamp plates 418.

The last main component of the sled testing system 112 is the acceleration absorption assembly 116 which may utilize any suitable energy absorption material or apparatus such as a pneumatic or hydraulic cylinder. In the embodiment shown, the acceleration absorption assembly 116 includes an absorption piston 118 and a backing cylinder 120. More specifically, as shown in FIG. 2, the absorption piston 118 is a clevis pin while the backing cylinder 120 is an appropriate hydraulic cylinder. Such hydraulic cylinders may be obtained through Lynair Inc., 3515 Scheele Drive, Jackson, Mich. 49204. For example, one such cylinder deemed suitable is a Lynair Model H-7802-30-3-P1, 300 p.s.i. hydraulic cylinder with rod clevis RC-3022.

The components constituting the sled testing system 112 embodiment shown may be assembled as follows. First, the main sled carriage 112 having slide and brake assemblies 154 sans the lower block 292 may be lowered so as to slidably engage the rails "R". As shown in FIG. 13, the lower block 292 may then be connected to the upper block 280 via a bolt and nut assembly 296.

As shown in FIGS. 6 and 11, the sled column assembly 370 of the secondary carriage 114 may be assembled with the main frame 150 of the main sled carriage 112 such that the guide rails 386 will slidingly engage the guide bearing channel 212 of the main frame 150.

As shown in FIGS. 2 and 3, the secondary carriage slide frame assembly 372 together with the A-frame fixture assembly 374 may be connected to the fixture mount assembly 392 of the sled column assembly 370 by bolting or any other suitable manner. At the same time, and as shown in FIG. 11, in order to avoid unnecessary torque on the sled column assembly 370, the slider guide 408 of the secondary carriage slide frame assembly 372 of the secondary carriage 114 is inserted within the slider bearing channel 240 of the slider bearing 238 of the main frame 150 before the slider stop assemblies 242 are connected. The absorption piston 118 may then be suitably pinned to the absorption mount plates 388 and the backing cylinder 120 may be suitably pinned to the cylinder mount plate 178.

At any appropriate time, the alignment guide assemblies 156 may be adjusted relative to the rails "R" to provide proper guidance and the recoil lever assembly 160 may be attached to recoil rachet lever mount plate 202 and the recoil cylinder mounting plates 206 as shown in FIG. 2.

Operation of the sled testing system 100 is relatively simple. The sled testing system 100 as shown in FIGS. 2–17, may be moved via the return assembly 158 which is adjusted downwardly to engage a chain link drive (not shown), the chain link drive being driven so as to move the sled testing system 100 along the rails "R" until the column contact plate 382 of the sled column assembly 370 of the secondary carriage 114 is in contact with a driving member "D" which may comprise a pneumatically or other type driven piston. An interior or any other component of a vehicle desired to be tested may be mounted onto the fixture plate 152. Dummies may also be situated as desired. A separate component of the vehicle being tested and to be accelerated at a different rate, such as a door panel, may be mounted onto the A-frame fixture assembly 374.

In operation, when the driving member "D" is actuated, it will accelerate the secondary carriage 114 in the direction shown as "A". The guide rails 386 of the sled column assembly 370 will slide within the bearing channel 212 of the main frame 150 while the slider guides 408 of the secondary carriage 114 will likewise slide within the slider bearing channel 240 of the slider bearing 238 of the main frame 150. The absorption piston 118 connected to the acceleration absorption mount plates 388 of the sled column assembly 370 will likewise be accelerated at the same rate.

However, the main sled carriage 112 carrying the interior or any other vehicular component will be accelerated at a different rate along the rails "R" depending upon the properties of the acceleration absorption assembly 116. In other words, in the embodiment shown, the main sled carriage 112 will be accelerated at a rate along the rails "R" in the direction "A" depending on the hydraulic properties of the backing cylinder 120. The slide and brake assembly 154 may then be actuated to slow down and stop the main sled carriage 112 along the rails "R" and the recoil lever assembly 160 will have moved the rachet bar 350 and recoil bumper 356 in the direction marked "L" such that the rachet bumper 356 may engage the recoil ears 389 in the event the secondary carriage 114 recoils relative to the main carriage 112 thereby preventing any damage to any components of the system. The return assembly 158 may then be used to again return the main carriage 112 to the starting position.

As previously noted, because any vehicular component mounted to the A-frame fixture assembly 374 will not be subjected to any direct impact, it may be desirable to use a pre-impacted vehicle component, such as a pre-crushed door, in order to more accurately simulate the condition of a crash.

Accordingly, the sled testing system 100 of this invention will allow different components of a vehicle to be accelerated at different rates in order to more accurately simulate a crash. Furthermore, the sled testing system 100 of this invention will allow different components of the vehicle to be accelerated at different rates which may be controlled in order to simulate specific crash scenarios.

An alternative embodiment of this invention has been depicted in the schematic of FIG. 18. This embodiment is similar to the embodiment of FIG. 1. Each of the components 12a–34a of the sled testing system 10a shown in FIG. 8 are similar to the like numbered components 12–34 of the sled testing system 10 shown in FIG. 1. The differences are that the component of the vehicle experiencing initial impact simulation acceleration is not mounted on the secondary carriage 14a but is instead mounted on a tertiary carriage 40a which is movably mounted to the main sled carriage 12a while being connected to a shock absorption assembly 42a which in turn is connected to the main sled carriage 12a. The shock absorption assembly 42a may be any suitable energy absorption material or apparatus such as mechanical springs or pneumatic or hydraulic cylinders. The tertiary carriage 40a may be movably mounted to the main sled carriage 12a in any suitable manner. While rollers 44a are shown in the FIG. 18 schematic, any type of arrangement may be used which allows the tertiary carriage 40a to move relative to the main carriage 12a, such as a sliding rail-type assembly. In use, a barrier 46a, such as a honeycomb barrier, may be mounted on the side of the secondary carriage 14a so as to simulate the crushing of a secondary vehicle impacting the primary vehicle components being tested.

In operation, the secondary carriage 14a carrying the collapsible barrier 46a is acceleratingly driven by the driving member 32a in the direction "A". In such a manner, the secondary carriage 14a is driven into a vehicle component, such as a door 30a, being carried by the tertiary carriage 40a. The barrier 46a will collapse to some extent as it contacts and accelerates the tertiary carriage 40a and the vehicle component, such as a door 30a, in the direction "A" at a tertiary carriage rate. The vehicle component, such as a door 30a, will undergo some crushing as a result of the impact and will be decelerated to some extent by the shock absorption assembly 42a. At the same time, the absorption piston 18a is driven in the direction "A" into the backing cylinder 20a by the secondary carriage 14a. The backing carriage 20a will absorb some of the accelerative forces such that the main sled carriage 12a, together with the interior 26a and dummy 28a, will be accelerated at a different main sled carriage 12a rate. Like the embodiment shown in FIG. 10, a data box 34a may be mounted onto the main sled carriage 12a and be connected to the various components being tested in order to record information.

Another alternative embodiment of this invention is shown in the schematic of FIG. 19 which is similar to the embodiment shown in FIG. 1, except that the a tertiary carriage 40b carrying a barrier 46b is movable mounted to the main sled carriage 12a. Like the embodiment shown in FIG. 1, one component of a vehicle, such as interior components with dummies, may be mounted onto the main sled carriage 12b while other components, such as a door panel 306, may be mounted to the secondary carriage 14b. The barrier 46b, which may be a honeycomb barrier, serves the same purpose as it did with regard to the embodiment shown in FIG. 18.

In operation, the tertiary carriage 40b carrying the barrier 46b is acceleratingly driven by driving member 32b in the direction "A" at a tertiary carriage rate such that the barrier 46b impacts a vehicle component, such as a door panel 30b, mounted onto the secondary carriage 14b. The absorption piston 18b is then driven in the direction "A" by the secondary carriage 14b into the backing cylinder 20b. The backing cylinder 20b will absorb some of the accelerated forces such that the main sled carriage 12b, together with the interior 26b and dummy 28b, will be accelerated at a different main sled carriage rate. Like previous embodiments, a data box 34b may be mounted onto the main sled carriage 12b and be connected to the various components being tested in order to record information.

Because the vehicle component, such as a door panel 30a and 30b, is being impacted in each of the embodiments shown in FIGS. 18 and 19 respectively, it is not necessary to use a pre-impacted vehicle component, such as a pre-crushed door, in order to simulate the condition of a crash.

Like the sled testing system 10 shown in FIG. 1, sled testing systems 10a and 10b shown in FIGS. 18 and 19 respectively will allow different components of a vehicle to be accelerated at different rates in order to more accurately simulate a crash.

While particular embodiments of the invention have been illustrated and described, it will be obvious to those skilled in the art that various changes and modifications may be made without departing from the invention. It is intended that the following claims cover all such modifications and all equivalents that fall within the spirit and scope of this invention.

What is claimed is:

1. A sled testing system having a driving member, the sled testing system comprising:

a first carriage, a second carriage, the first carriage and second carriage being movably mounted together, and an acceleration absorption assembly located relative to the first carriage and the second carriage such that when the second carriage is accelerated by the driving member at a second carriage rate, the first carriage will be simultaneously accelerated at a first carriage rate via the acceleration absorption assembly.

2. The sled testing system of claim 1 wherein the first carriage is a movable main sled carriage add the second carriage is movably mounted to the main sled carriage.

3. The sled testing system of claim 2 further including rails upon which the movable main sled carriage is slidably mounted.

4. The sled testing system of claim 3 wherein the main sled carriage includes a slide and brake assembly which slidably engages the rails and which may be activated so as to brake the main sled carriage after it is accelerated at the main sled carriage rate.

5. The sled testing system of claim 2 wherein the main sled carriage includes a recoil lever assembly which may engage the second carriage after the second carriage has been accelerated at the second carriage rate and in the event the second carriage recoils relative to the main carriage.

6. The sled testing system of claim 2 further including a tertiary carriage mounted to the main sled carriage such that when the secondary carriage is accelerated at a second carriage rate to impact the tertiary carriage, the tertiary carriage will be accelerated at a tertiary carriage rate and the main sled carriage will be accelerated at a main sled carriage rate.

7. The sled testing system of claim 6 wherein the tertiary carriage is movably mounted to the main sled carriage.

8. The sled testing system of claim 7 further including a shock absorption assembly connected between the tertiary carriage and the main sled carriage.

9. The sled testing system of claim 2 further including an impacter carriage movably mounted to the main sled carriage such that when the impacter carriage is accelerated to impact and accelerate the secondary carriage at a secondary carriage rate the main sled carriage will be accelerated at a main sled carriage rate.

10. The sled testing system of claim 1 wherein the second carriage slidably engages the first carriage.

11. The sled testing system of claim 1 wherein the acceleration absorption assembly is connected to the first carriage and second carriage such that when the second carriage is accelerated at a second carriage rate, the first sled carriage will be accelerated at a first carriage rate via the acceleration absorption assembly.

12. The sled testing system of claim 1 wherein the acceleration absorption assembly includes a backing cylinder from which extends an absorption piston, one of the backing cylinder and absorption piston being mounted to the first carriage and the other one of the backing cylinder and absorption piston being mounted to the second carriage.

13. The sled testing system of claim 1 wherein the driving member is a pneumatically driven piston.

14. A sled testing system having a driving member for testing first and second vehicle components during a crash situation, the sled testing system comprising:

a first carriage supporting the first vehicle component, a second carriage supporting the second vehicle component, and an acceleration absorption assembly located relative to the first carriage and the second carriage such that when the second carriage is accelerated by the driving member at a second carriage rate, the first carriage will be accelerated via the acceleration absorption assembly at a first carriage rate.

15. The sled testing system of claim 14 wherein the exterior component is a pre-crushed exterior vehicle component.

16. The sled testing system of claim 14 further including an impacter carriage movably mounted to the main sled carriage such that when the impacter carriage is accelerated to impact and accelerate the secondary carriage at a secondary carriage rate, the main sled carriage will be accelerated at a main sled carriage rate.

17. The sled testing system of claim 14 wherein the first vehicle component is a vehicle interior component and the second vehicle component is a vehicle exterior component.

18. A sled testing system having a driving member for testing first and second vehicle components during a crash situation, the sled testing system comprising:

a movable main sled carriage supporting the first vehicle component, a tertiary carriage movably mounted to the main sled carriage, a secondary carriage movably mounted to the main sled carriage, an acceleration absorption assembly located relative to the main sled carriage and the secondary carriage such that when the secondary carriage is accelerated at a secondary carriage rate the main sled carriage will be accelerated via the vehicle absorption assembly at a main sled carriage rate, and one of the secondary carriage and tertiary carriage supporting the second vehicle component such that when the other one of the secondary carriage and tertiary carriage is accelerated by the driving member so that the other one of the secondary carriage and tertiary carriage will impact the second vehicle component the main sled carriage will be accelerated at the main sled carriage rate via the acceleration absorption assembly.

19. The sled testing system of claim 18 wherein the tertiary carriage is movably mounted to the main sled carriage.

20. The sled testing system of claim 19 further including a shock absorption assembly connected between the tertiary carriage and the main sled carriage.

21. The sled testing system of claim 18 wherein the first vehicle component is a vehicle interior component and the second vehicle component is a vehicle exterior component.

22. The sled testing system of claim 18 wherein a shock absorption assembly is located so as to operably engage the main sled carriage and tertiary carriage.

23. The sled testing system of claim 18 wherein the other one of the second carriage and tertiary carriage supports a barrier which impacts the second vehicle component.

24. The sled testing system of claim 23 wherein the barrier is collapsible.

25. A sled testing system having rails and a driving member, the sled testing system comprising:

a first carriage movably mounted on the rails, a second carriage movably mounted on the first carriage, and an acceleration absorption assembly located relative to the first carriage and the second carriage such that when the second carriage is accelerated by the driving member at a second carriage rate, the first carriage will be accelerated at a first carriage rate.

26. The sled testing system of claim 25 wherein the acceleration absorption assembly is connected to the first carriage and the second carriage.

27. The sled testing system of claim 25 wherein the acceleration absorption assembly includes a backing cylinder from which extends an absorption piston, one of the backing cylinder and absorption piston being mounted to the first carriage and the other one of the backing cylinder and absorption piston being mounted to the second carriage.

28. A sled testing system having a driving member, the sled testing system comprising:

a first carriage, a second carriage, the first carriage and second being movably mounted together, and an acceleration absorption assembly including a backing cylinder from which extends an absorption piston, one of the backing cylinder and absorption piston being mounted to the first carriage and the other one of the backing cylinder and absorption piston being mounted to the second carriage, such that when the second carriage is accelerated by the driving member at a second carriage rate, the first carriage will be accelerated at a first carriage rate via the acceleration absorption assembly.

29. A sled testing system having a driving member, the sled testing system comprising:

a movable main sled carriage, a second carriage movably mounted to the main sled carriage, an impacter carriage movably mounted to the main sled carriage, and an acceleration absorption assembly located relative to the first carriage and the second carriage such that when the impacter carriage is accelerated by the driving member to impact and accelerate the secondary carriage at a secondary carriage rate the main sled carriage will be accelerated at a main sled carriage rate via the acceleration absorption assembly.

* * * * *